United States Patent [19]

Watts et al.

[11] Patent Number: 4,811,983
[45] Date of Patent: Mar. 14, 1989

[54] GAS SPRING WITH LATCHING STOP MECHANISM FOR USE ON SKID-STEER LOADERS

[75] Inventors: Verne C. Watts; Orlan J. Loraas; Wally L. Kaczmarski, all of Lisbon; James E. Asche, Milnor, all of N. Dak.

[73] Assignee: Clark Equipment Company, South Bend, Ind.

[21] Appl. No.: 110,226

[22] Filed: Oct. 19, 1987

Related U.S. Application Data

[63] Continuation-in-part of Ser. No. 931,681, Nov. 17, 1986, abandoned.

[51] Int. Cl.[4] .............................................. B60J 1/00
[52] U.S. Cl. ........................................ 296/190; 92/23; 92/30; 180/89.14; 188/67; 188/300; 248/407; 267/64.12; 403/329
[58] Field of Search ............... 267/64.12; 188/67, 300; 403/108, 109, 329; 92/23, 30; 180/89.14, 89.15; 248/407, 561; 296/190

[56] References Cited

U.S. PATENT DOCUMENTS

| | | | |
|---|---|---|---|
| 1,274,117 | 7/1918 | Webster | 188/67 X |
| 2,047,485 | 7/1936 | McBrady | 294/57 |
| 2,415,478 | 2/1947 | Forney | 280/33.14 |
| 2,455,765 | 12/1948 | Harvey | 403/329 X |
| 2,477,167 | 7/1949 | Bliss | 214/65 |
| 2,652,272 | 9/1953 | Wood | 403/109 X |
| 2,662,712 | 12/1953 | Rose | 248/161 |
| 2,994,900 | 8/1961 | Smithers | 403/108 X |
| 2,996,210 | 8/1961 | Thomas | 217/60 |
| 3,157,429 | 11/1964 | Harms et al. | 296/76 |
| 3,411,475 | 11/1968 | Sheff | 116/70 |
| 3,430,456 | 3/1969 | Stricker | 64/1 |
| 3,446,523 | 5/1969 | Little | 287/58 |
| 3,662,653 | 5/1972 | Carlson et al. | 92/25 |
| 3,704,850 | 12/1972 | Hendrickson et al. | 248/188.5 |
| 3,883,126 | 5/1975 | Nicholls | 267/65 R |
| 3,982,648 | 9/1976 | Luedtke et al. | 214/776 |
| 4,078,779 | 3/1978 | Molders | 267/120 |
| 4,155,433 | 5/1979 | Porter | 188/300 |
| 4,218,169 | 8/1980 | Arends | 414/523 |
| 4,276,814 | 7/1981 | Bass et al. | 92/23 |
| 4,401,179 | 8/1983 | Anderson | 180/89.14 |
| 4,408,672 | 10/1983 | Albright et al. | 180/89.14 |
| 4,449,702 | 5/1984 | Hasegawa | 267/64.12 |
| 4,596,383 | 6/1986 | Howard | 267/64.12 |

FOREIGN PATENT DOCUMENTS

| | | | |
|---|---|---|---|
| 1531063 | 8/1969 | Fed. Rep. of Germany . | |
| 77273 | 5/1982 | Japan | 180/89.14 |

OTHER PUBLICATIONS

Product Brochure "Stabilus Lift-O-Mat Gasfeder-Typenprogramm" Product Brochure Lift-O-Stop/Hydro-Lift.

Primary Examiner—George E. A. Halvosa
Attorney, Agent, or Firm—Kinney & Lange

[57] ABSTRACT

A gas spring for supporting a cab enclosure pivotably mounted to the body of a skid-steer vehicle. A stop tube is mounted to a piston rod and is telescopically cooperable with a cylinder body. Two parallel slots extend in a transverse direction through the stop tube. A stop slide has a pair of legs which are adapted to slide within the slots of a stop tube. A release portion of the stop slide is sized to permit the cylinder body to pass between the legs, while a stop portion is sized to prevent the cylinder body from passing between the legs. A spring urges the stop slide toward a stop position at which the stop portion of the stop slide is aligned with the cylinder body when the piston rod is extended. The cab enclosure is thereby latched to a tilt-back position. To lower the cab enclosure, the stop slide must be manually moved to a release position at which the release portion is aligned with the cylinder body, thereby permitting the cylinder body to pass between the legs of the stop slide with the piston rod retracted therein. A release cable coupled between a forward end of the cab enclosure and the stop slide can be actuated to conveniently move the step slide to its release position.

27 Claims, 5 Drawing Sheets

GAS SPRING WITH LATCHING STOP MECHANISM FOR USE ON SKID-STEER LOADERS

This is a continuation-in-part application of Application Ser. No. 931,681, filed Nov. 17, 1986, now abandoned.

BACKGROUND OF THE INVENTION

1. Field of the Invention

The present invention relates generally to gas springs. In particular, the present invention is a gas spring with a latching stop mechanism for use on skid-steer loader vehicles.

2. Description of the Prior Art

Skid-steer loaders are popular and in widespread use. The operator's compartment of vehicles of this type is typically enclosed by a cab enclosure such as that illustrated in the Albright et al U.S. Pat. No. 4,408,672. The cab enclosure shown in the Albright et al patent is pivotably secured to the vehicle frame so that it can be raised to a tilt-back position to provide a service technician with better access to components contained with the interior frame of the structure. In the embodiment shown, a torsion spring serves as a mechanical assist for the technician rotating the cab enclosure backwards. A latch mechanism which includes a latch member, spring, and cam, restrains the cab enclosure from forward movement when latched in its tilt-back position.

Gas springs are sometimes used in addition or as an alternative to the torsion spring shown in the Albright et al patent. Gas springs are well known and commercially available from a number of different manufacturers including Suspa Inc. and Gas Spring Corporation. Gas springs with mechanical lock or latching mechanisms are also known and are disclosed, for example, in the Nicholls U.S. Pat. No. 3,883,126, Molders U.S. Pat. No. 4,078,779, Hasegawa U.S. Pat. No. 4,449,702. The Howard U.S. Pat. No. 4,596,383 also discloses a gas spring with a mechanical stop. Mechanical stops of this type cause an eccentric load on the gas spring. Although this may not be a problem when the spring is used to support light loads, it can be a problem with heavier loads which can cause the gas spring to buckle. A stroke-limiting stop for a positioning device is also disclosed in the Porter U.S. Pat. No. 4,155,433.

There is a continuing need for gas springs with improved latch mechanisms. A latch mechanism which can be integrally mounted to the gas spring is desired. The latch mechanism should also linearly load the gas spring. The latch mechanism must, of course, be reliable and convenient to use.

SUMMARY OF THE INVENTION

The present invention is a gas spring which includes a cylinder body, and a piston rod having a first end extending from the cylinder body and adapted for reciprocal linear movement between a normally extended position and a retracted position. A stop tube mounted to the first end of the piston rod is telescopically cooperable with the cylinder body. Two slots are positioned on opposite sides of and extend through the stop tube. A stop slide has a pair of legs adapted to slide within the slots of the stop tube. The stop slide has a release portion which will permit the cylinder body to pass between the legs, and a stop portion which prohibits the cylinder body from passing between the legs. Bias means bias the stop slide from a release position at which the release portion is aligned with the cylinder body, toward a stop position at which the stop portion is aligned with the cylinder body.

The gas spring is preferably used to support a cab enclosure pivotally mounted to a skid-steer vehicle. The bias means can include a spring. The two slots are parallel to one another, and positioned in a transverse direction with respect to the stop tube. The gas spring can be positively latched to support the cab enclosure in its raised or tilt-back position. The latch mechanism causes the gas spring to be linearly loaded under the relatively heavy cab enclosure. A release cable coupled between the latch mechanism and the front of the cab enclosure can be actuated to conveniently release the latch when the cab is to be lowered.

DETAILED DESCRIPTION OF THE PREFERRED EMBODIMENTS

Figure 1:
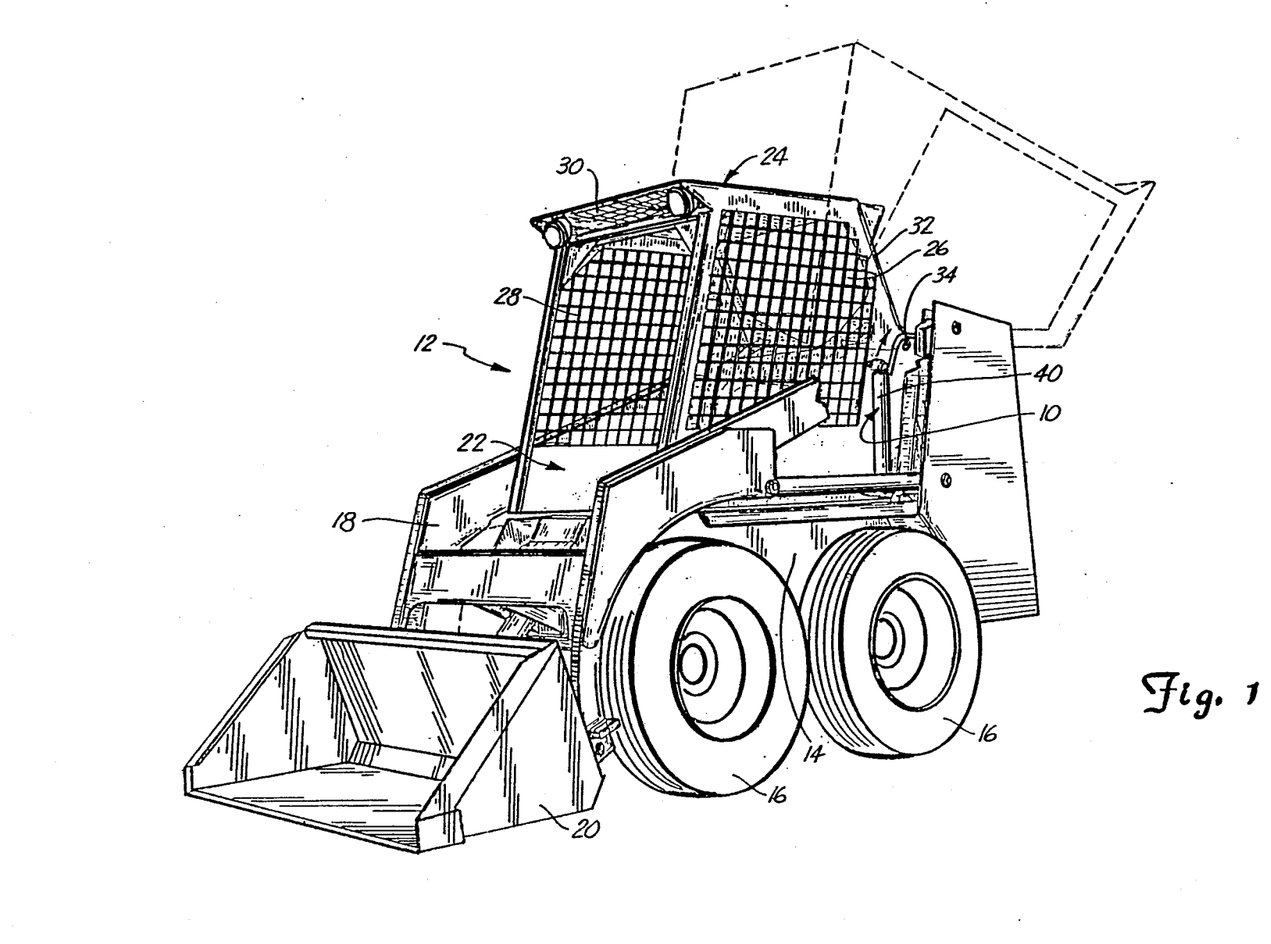
FIG. 1 is an illustration of a skid-steer vehicle which includes a gas spring in accordance with the present invention. The cab enclosure is illustrated in phantom in its tilt-back position.

A skid-steer loader 12 which includes a gas spring 10 in accordance with the present invention is illustrated generally in FIG. 1. As shown, loader 12 includes a body 14 which is supported for over-the-ground travel by wheels 16, and a boom assembly 18 to which a bucket 20 is mounted. A cab or operator's compartment 22 is surrounded by a cab enclosure 24.

Cab enclosure 24 includes side panels 26 and 28, top panel 30 and a rear panel 32. Cab enclosure 24 is pivotably mounted to body 14 by means of pivot pins 34 (only one is shown in FIG. 1). Gas spring 10 includes a cylinder body 40 which is pivotably mounted to side panel 26 of cab enclosure 24, and a piston rod 42 (not visible in FIG. 1) which has an end pivotably mounted to body 14. When cab enclosure 24 is positioned in its operating position, piston rod 42 is forced to a retracted position within cylinder body 40 against the bias force applied by gas spring 10 and is secured in this position by a cab enclosure latching mechanism (not shown). When the cab enclosure latching mechanism is released, the bias force of gas spring 10 will force piston rod 42 to an extended position from the cylinder body 40, thereby pivotably raising cab enclosure 24 to a raised or tilt-back position shown in phantom in FIG. 1. Various mechanical systems of the loader can be serviced when cab enclosure 24 is raised to its tilt-back position.

Figure 2A:
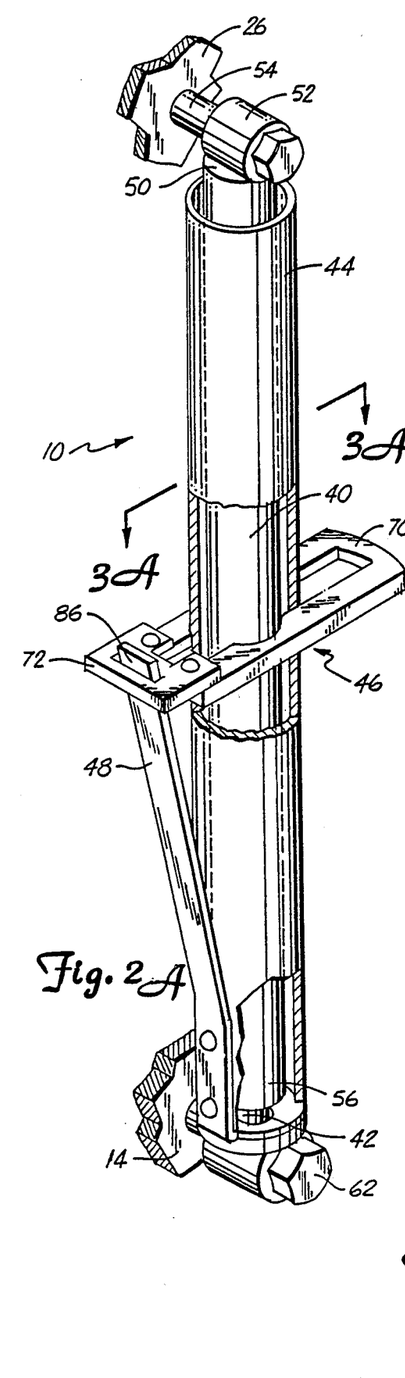
FIG. 2A is a detailed view of the gas spring in its retracted and unlatched position, with portions thereof broken away.
Figure 2B:
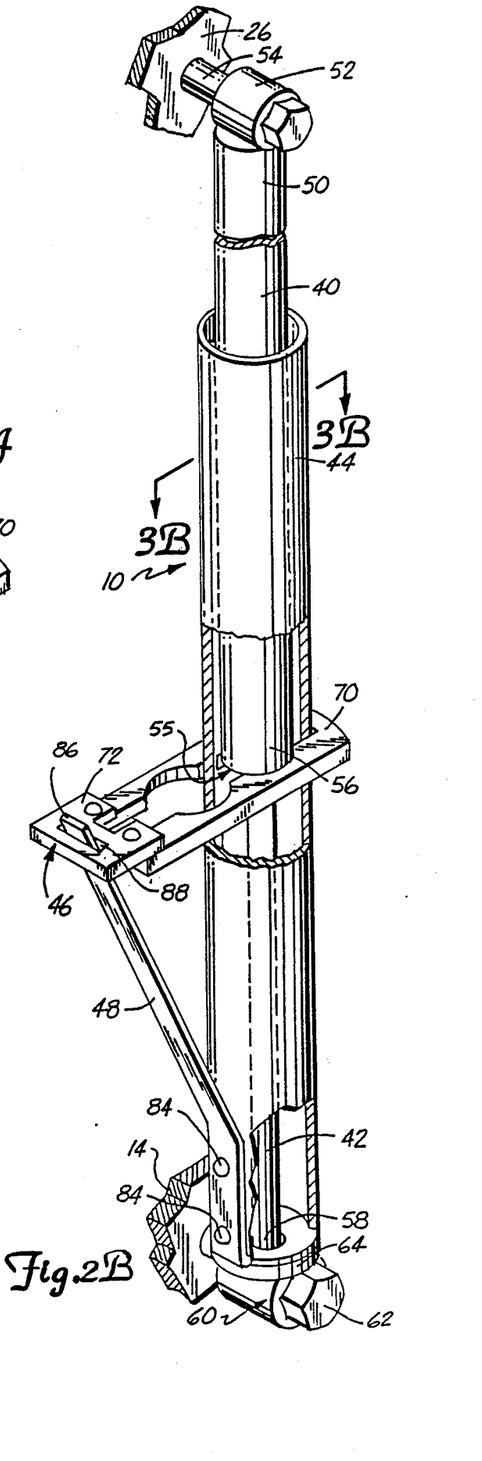
FIG. 2B is a view of the gas spring in its extended and latched position, with portions thereof broken away.

Gas spring 10 is illustrated in greater detail in FIGS. 2A and 2B. As shown, gas spring 10 includes a cylinder body 40, piston rod 42, stop tube 44, stop slide 46, and spring 48. Cylinder body 40 has a circular cross section in the embodiment shown. Mounting clevis 52 is affixed to a first end 50 of cylinder body 40. Pivot pin 54 extends through mounting clevis 52 and is fastened to side panel 26 of cab enclosure 24, thereby pivotally attaching cylinder body 40 to the cab enclosure. Piston rod 42 extends from a second end 56 of cylinder body 40. A first end 58 of piston rod 42 is terminated with mounting clevis 60 which is pivotably fastened to body 14 of skid-steer loader 10 by means of pivot pin 62.

The principle by which cylinder body 40 and piston rod 42 of gas spring 10 interact is well known. Piston rod 42 is adapted for reciprocal linear movement within cylinder body 40. When no external forces are applied, gas spring 10 produces a bias force which urges piston rod 42 from cylinder body 40 to a normally extended position shown in FIG. 2B. When a force is applied between piston rod 42 and cylinder body 40, (e.g., when cab enclosure 24 is lowered to is operating position), the piston rod is forced within cylinder body 40 to a retracted position, shown in FIG. 2A, against the bias force of gas spring 10.

Stop tube 44, stop slide 46, and leaf spring 48 form a mechanical latch mechanism which positively ensures that piston rod 42 remains in its extended position from cylinder body 40 when cab enclosure 24 is raised to its tilt-back position. Piston rod 42 is prohibited from returning to its retracted position within cylinder body 40 until the latch mechanism is manually released.

Figure 3A:
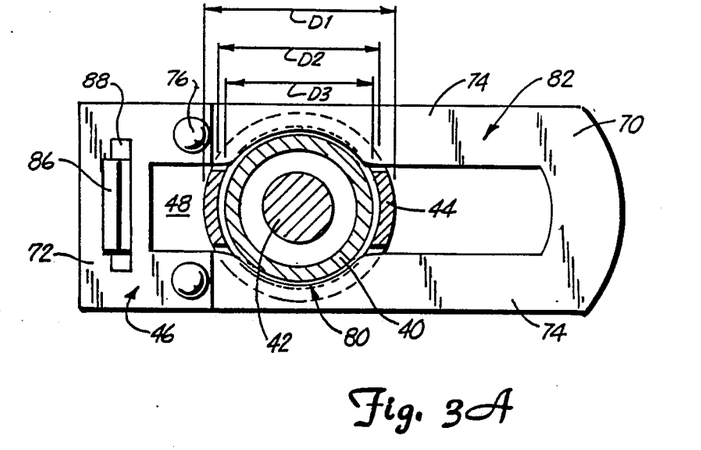
FIG. 3A is a sectional view taken along lines 3A—3A of FIG. 2A, illustrating a latch mechanism thereof in its release position.
Figure 3B:
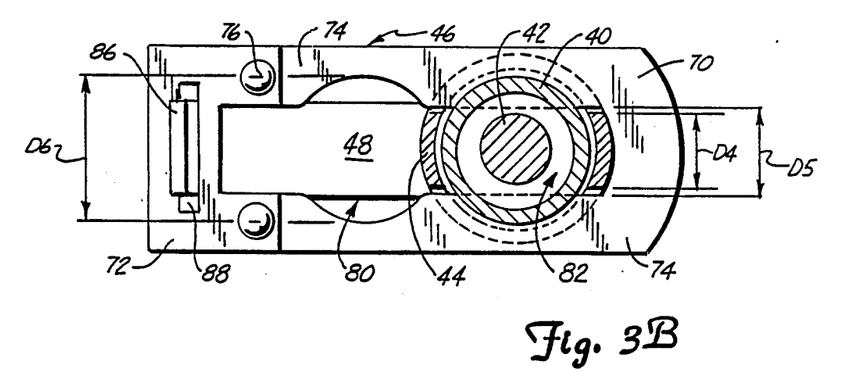
FIG. 3B is a sectional view taken along lines 3B—3B of FIG. 2B, illustrating the latch mechanism in its stop position

As perhaps best shown in FIGS. 3A and 3B, stop tube 44 is circular in cross section and has an outside diameter D1 and an inside diameter D2. Inside diameter D2 of stop tube 44 is greater than outside diameter D3 of cylinder body 40, thereby permitting the cylinder body to extend and retract within, or telescopically cooperate with stop tube 44.

Figure 4:
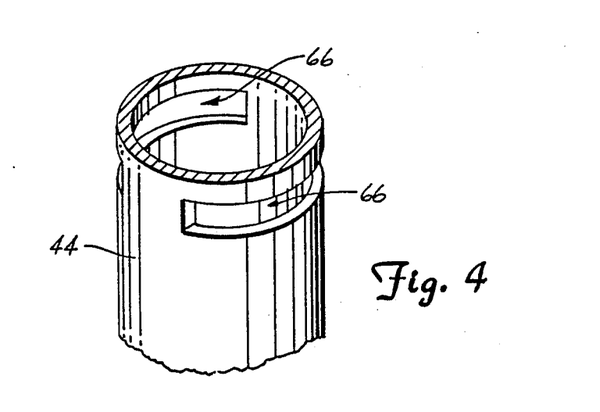
FIG. 4 is a detailed view illustrating the slots of the stop tube shown in FIGS. 2A and 2B.

Referring back to FIGS. 2A and 2B, stop tube 44 has a first end 64 which is mounted in any desirable manner to either first end 58 of piston rod 42, or mounting clevis 60. As perhaps best shown in FIG. 4, stop tube 44 also includes a pair of slots 66 which are positioned on opposite sides of the stop tube and oriented parallel to one another perpendicular to a longitudinal axis of the stop tube. Slots 66 are located on stop tube 44 at a distance from mounting clevis 60 that it ss desired to latch first end 58 of piston rod 42 from second end 56 of cylinder body 40.

Stop slide 46 includes a slide lock 70 and a slide support 72. As shown in FIGS. 3A and 3B, slide lock 70 is generally U-shaped, and includes a pair of legs 74 which are generally parallel to one another and spaced by a distance D5 which is slightly larger than distance D4 separating slots 66 on stop tube 44. Once slide lock 70 is fit onto stop tube 44, slide support 72 can be affixed thereto by rivets 76.

Stop slide 46 includes a release portion 80 and a stop portion 82. Release portion 80 is formed by narrowing legs 74 so as to form a circular opening within stop slide 46 which has a diameter D6 which is greater than outside diameter D3 of cylinder body 40. Cylinder body 40 can thereby pass through release portion 80 of stop slide 46. Stop portion 82 is a portion of stop slide 46 at which arms 74 extend into stop tube 44 to an extent that the distance D5 by which they are separated is greater than the diameter of piston rod 42 and less than the diameter D3 of cylinder body 40.

Leaf spring 48 has a first end which is attached near first end 64 of stop tube 44 by means of rivets 84. A second end of leaf spring 48 includes a tongue 86 which fits into and through a slot 88 within slide support 72 of locking slide 46. A bias force applied by leaf spring 48 urges stop slide 46 to a stop position illustrated in FIGS. 2B and 3B at which stop portion 82 of the stop slide is positioned adjacent face 55 on the first end 56 of cylinder body 40. Piston rod 42 is thereby prevented from being retracted within cylinder body 44 since base 55 of the cylinder body abuts against legs 74 of stop slide 46. To retract piston rod 42 within cylinder body 40, it is necessary to slide the stop slide 46 to its release position illustrated in FIGS. 2A and 3A against the bias force of leaf spring 48. This can be done by squeezing spring 48 toward stop tube 44. Release portion 48 of stop slide 46 is then positioned in line with cylinder body 40 in the release position. Cylinder body 40 can thereby fit and pass between legs 74 of stop slide 46, permitting piston rod 42 be forced to its retracted position within the cylinder body 40.

Since the latch is perpendicular to the longitudinal axis of the gas spring, the spring is not eccentrically loaded by the cab enclosure. The telescoping stop tube provides further support to prevent the spring from buckling, thereby increasing reliability. Also, the lighter the load to be supported, the nearer the end of the stop tube the latch can be placed.

Figure 5:
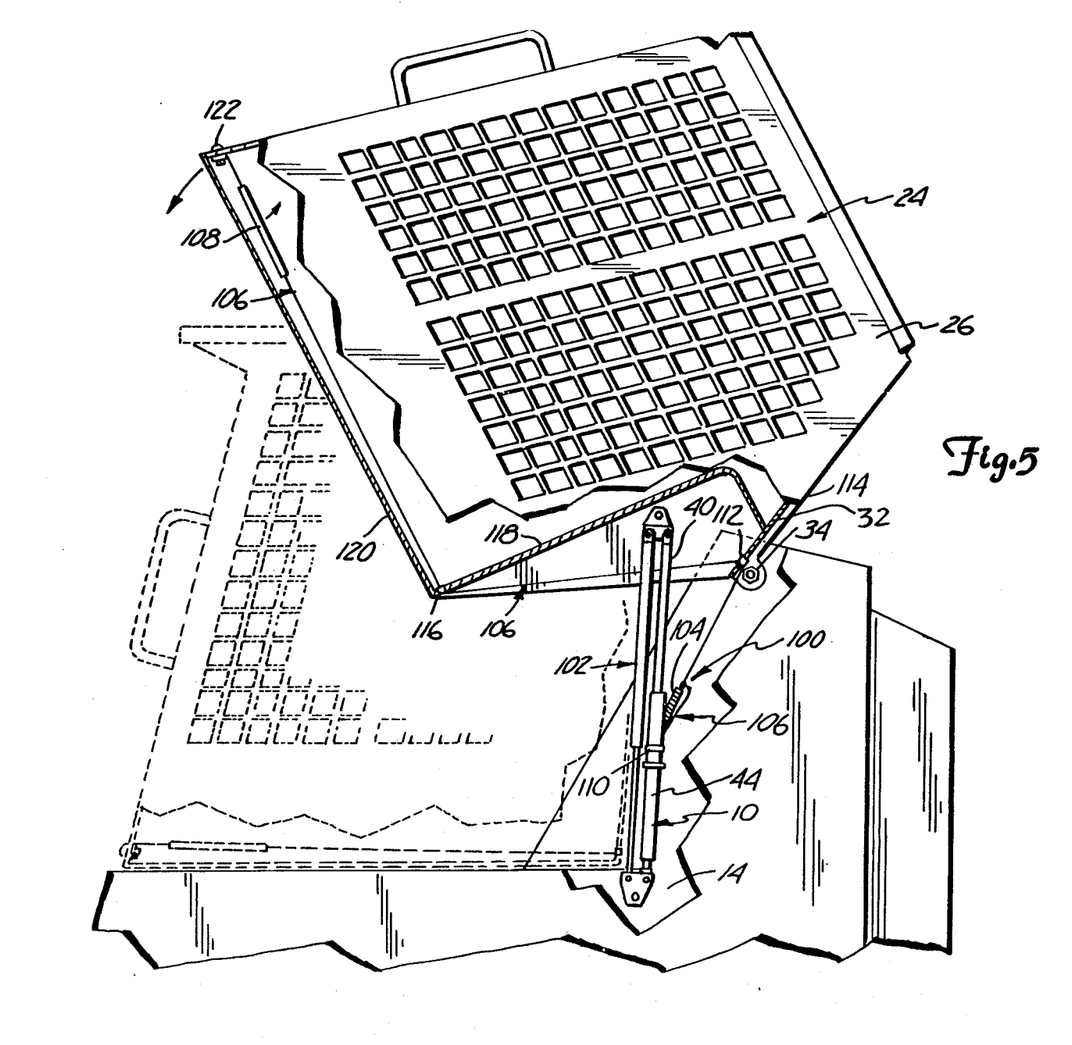
FIG. 5 is an illustration of a release cable in accordance with the present invention extending between the latch mechanism and the front of the cab enclosure.
Figure 6:
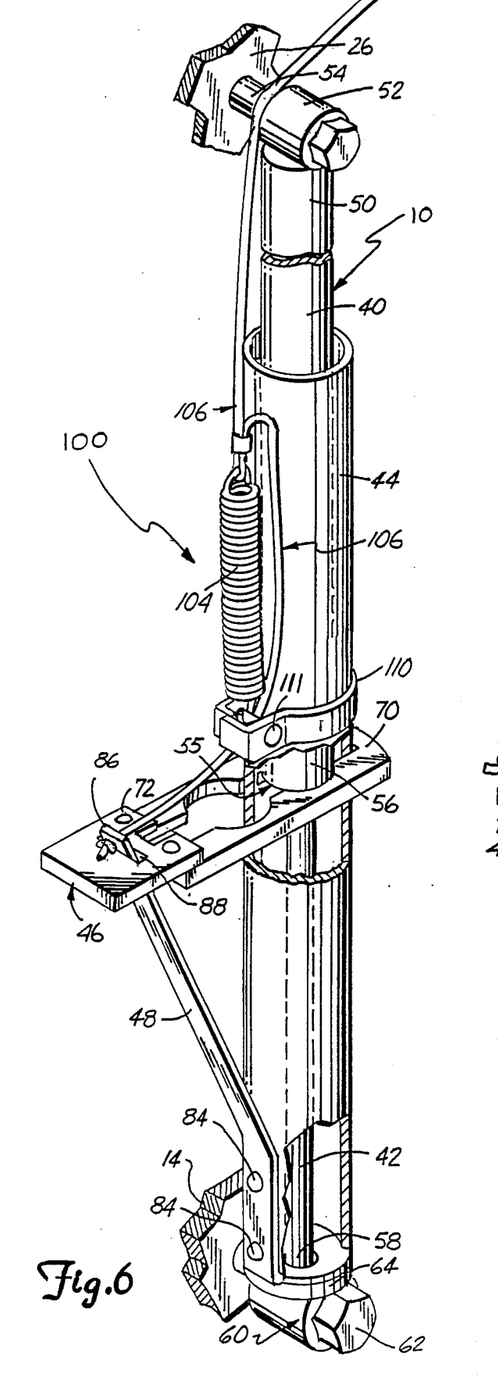
FIG. 6 is a detailed illustration of the interconnection of the release cable to the latch mechanism.
Figure 7:
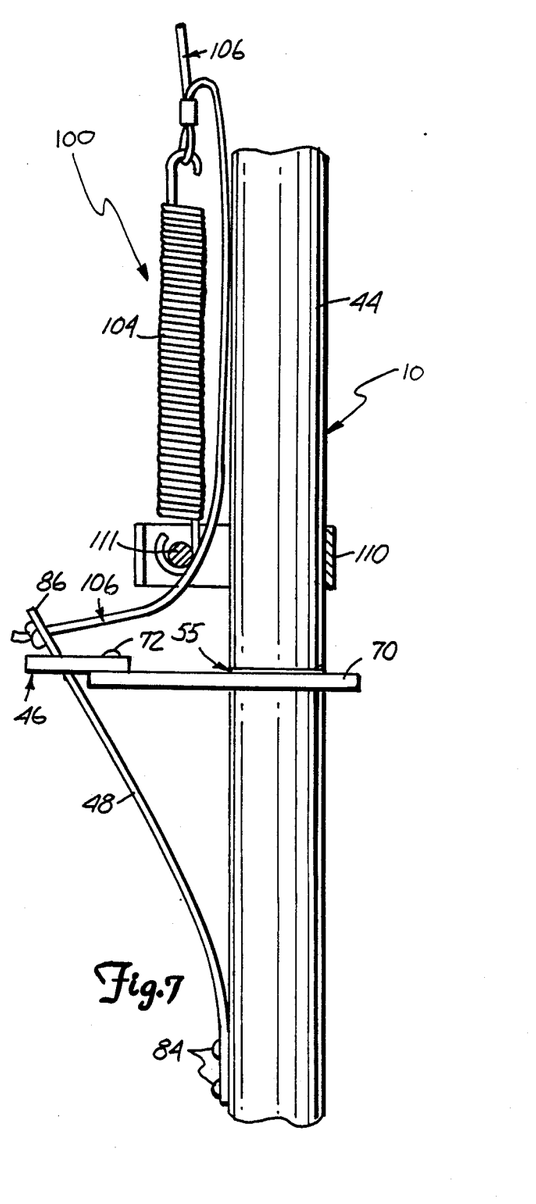
FIG. 7 is a detailed illustration of the interconnection of the release cable to the latch mechanism, with portions of the clamp and bolt shown in section to illustrate the interaction of the spring and cable with the bolt.

An unlatching mechanism 100 which can be used in conjunction with gas spring 10 is illustrated in FIGS. 5-7. Cab enclosure 24 is supported in its raised or tilt-back position by first gas spring 10 and a second gas spring 102 in the embodiment shown. Gas spring 10 includes a latch mechanism in accordance with the present invention, while gas spring 102 is of conventional design and does not include a latch mechanism. Release mechanism 100 can be used by an operator to conveniently unlatch the latch mechanism and thereby permit cab enclosure 24 to be rotated to its lowered or operating position which is shown in phantom in FIG. 5.

Release mechanism 100 includes a tension spring 104, cable 106, handle 108 clamp 110 and carriage bolt 111. Clamp 110 surrounds a portion of stop tube 44 near slide lock 70, and is clamped thereto by means of bolt 111. As perhaps best shown in FIG. 7, bolt 111 is spaced from stop tube 44, with its longitudinal axis oriented perpendicular to a longitudinal axis of the stop tube and gas spring. Spring 104 is a coil spring in the embodiment shown and has a first end hooked around and anchored to bolt 111. A first end of cable 106 is attached to the latch mechanism. In the embodiment shown, cable 106 is attached to tongue 86 of leaf spring 48 which extends beyond stop slide 46. Cable 106 extends between bolt 111 and stop tube 44, and is then attached to a second end of spring 104 with a slack portion of the cable remaining between the spring and latch. Bolt 111 acts as both a guide for cable 106, and an anchor for spring 104.

From spring 104, cable 106 passes through a nylon liner 112 near a lower portion 114 of enclosure back panel 32. From liner 112, cable 106 extends to nylon liner 116 near a lower edge of back wall panel 118 where it enters the cab enclosure. From nylon liner 116, cable 106 extends along the inside of side panel 26, adjacent its lower edge 120. A second end of cable 106 is anchored to the lower forward edge of side panel 26 by means of bolt 122. Handle 108 is attached to a portion of cable 106 adjacent to the forward edge of panel 26. Tension spring 104 keeps the portion of cable 106 which extends between the spring and bolt 111 tight when cab enclosure 24 is in both its operating and tiltback positions.

To use release mechanism 100, an operator simply pulls cable 106 using handle 108. This motion of cable 106 is transferred to the latch mechanism and will pull stop slide 46 against the bias force of spring 48. Cab enclosure 24 can then be lowered. The operator can perform this operation while standing near the front of loader 10, and need not be within reach of the latch mechanism. Convenience of operation is thereby facilitated.

Although the present invention has been described with reference to preferred embodiments, workers skilled in the art will recognize that changes may be made in form and detail without departing from the spirit and scope of the invention.

What is claimed is:

1. A gas spring, comprising:
    a cylinder body;
    a piston rod having a first end extending from the cylinder body and adapted for reciprocal linear movement between a normally extended position and a retracted position;
    a stop tube mounted to the first end of the piston rod and telescopically cooperable with the cylinder body;
    two slots positioned on opposite sides of and extending through the stop tube;
    a stop slide having a pair of legs adapted to slide within the slots of the stop tube and having a release portion which will permit the cylinder body to pass between the legs, and a stop portion which will prohibit the cylinder body from passing between the legs; and
    bias means for releasably and automatically biasing the stop slide from a release position at which the release portion of the stop slide is aligned with the cylinder body toward a stop position at which the stop portion of the stop slide is aligned with the cylinder body.

2. The gas spring of claim 1 wherein the bias means includes a spring.

3. The gas spring of claim 1 wherein the slots are parallel to one another and positioned in a transverse direction with respect to a longitudinal axis of the stop tube.

4. The gas spring of claim 1 wherein the cylinder body and release portion of stop slide are circular in cross section.

5. The gas spring of claim 1 wherein the stop slide includes:
    a U-shaped slide lock;
    a slide support; and
    fastener means for fastening the slide support to the slide lock.

6. The gas spring of claim 2 wherein the spring comprises a leaf spring having a first end mounted to the stop tube and a second end coupled to the stop slide.

7. A gas spring for supporting a cab enclosure pivotably mounted to a vehicle, comprising:
    a cylinder body having a first end pivotably mounted to one of the cab enclosure and vehicle, and a second end;
    a piston rod having a first end extending from the cylinder body, pivotably mounted to the other of the cab enclosure and vehicle, and adapted for reciprocal linear movement between a normally extended position and a retracted position;
    a stop tube mounted with respect to the gas spring and telescopically cooperable with the cylinder body,
    two slots positioned on opposite sides of and extending through the stop tube;
    a stop slide having a pair of legs adapted to slide within the slots of the stop tube and having a release portion at which the cylinder body can pass between the legs, and a stop portion at which the cylinder body is prohibited from passing between the legs; and
    bias means for releasably and automatically biasing the stop slide from a release position at which the release portion of the stop slide is aligned with the cylinder body toward a stop position at which the stop portion of the stop slide is aligned with the cylinder body.

8. The gas spring of claim 7 wherein the bias means includes a spring.

9. The gas spring of claim 8 wherein the spring comprises a leaf spring having a first end mounted to the stop tube and a second end coupled to the stop slide.

10. The gas spring of claim 7 wherein the two slots are parallel to one another and positioned in a transverse direction with respect to a longitudinal axis of the stop tube.

11. The gas spring of claim 7 wherein the cylinder body and release portion of the stop slide are circular in cross section.

12. The gas spring of claim 7 wherein the stop slide includes:
    a U-shaped slide lock,
    a slide support: and
    fastener means for fastening the slide support to the slide lock.

13. The invention of claim 7 and further including release means having a first end coupled to the stop slide and a second end mounted for access within the cab enclosure, for permitting an operator to actuate the stop slide against the bias means at a location out of reach of the gas spring.

14. The invention of claim 13 wherein the release means includes a cable having a first end connected to the stop slide and a second end coupled to the cab enclosure.

15. The invention of claim 14 and further including means for mounting a length of the cable near its second end adjacent a lower side edge of the cab enclosure.

16. The invention of claim 15 and further including means for mounting the second end of the cable to the front edge of the cab enclosure adjacent the lower side edge.

17. The invention of claim 14 and further including a spring coupled to the cable for taking up slack.

18. The invention of claim 17 and further including:
    a bolt; and
    means for mounting the bolt in spaced-apart relation to the stop tube with a longitudinal axis of the bolt oriented perpendicular to a longitudinal axis of the stop tube, a first end of the spring mounted to the bolt and the cable extending between the bolt and the stop tube.

19. The invention of claim 13 and further including a handle mounted adjacent the second end of the release means.

20. A vehicle including:

a frame;

a cab enclosure pivotably mounted to the frame for rotation between an operating position and a raised position;

a gas spring having a cylinder body mounted to one of the frame and the cab enclosure, and a piston rod adapted for reciprocal movement between a normally extending position and a retracted position within the cylinder body and mounted to the other of the frame and cab enclosure, for supporting the cab enclosure in its raised position when the piston rod is extended from the a stop tube mounted with respect to the piston rod and telescopically cooperable with the cylinder body;

two slots positioned on opposite sides of and extending through the stop tube;

a stop slide having a pair of legs adapted to slide within the slots of the stop tube and having a release portion which will permit the cylinder body to pass between the legs, and a stop portion which will prohibit the cylinder body from passing between the legs;

bias means for biasing the stop slide from a release position at which the release portion of the stop slide is aligned with the cylinder body toward a stop position at which the stop portion of the stop slide is aligned with the cylinder body; and release means having a first end coupled to the stop slide and a second end mounted for access within the cab enclosure, for permitting the stop slide to be moved to its release position from a location out of reach from the stop slide.

21. The vehicle of claim 20 wherein the release means comprises a cable having a first end connected to the stop slide and a second end coupled to the cab enclosure.

22. The vehicle of claim 21 and further including a spring coupled to the cable for taking up slack.

23. The vehicle of claim 22 and further including:

a bolt; and means for mounting the bolt in spaced apart relation to the gas spring with a longitudinal axis of the bolt oriented perpendicular to a longitudinal axis of the gas spring, a first end of the spring mounted to the bolt and the cable extending between the bolt and the gas spring.

24. The vehicle of claim 21 and further including means for mounting a length of the cable near the second end adjacent a lower side edge of the cab enclosure.

25. The vehicle of claim 24 and further including means for mounting the second end of the cable to a front edge of the cab enclosure adjacent the lower side edge.

26. The vehicle of claim 24 and further including a handle mounted to the second end of the cable.

27. The vehicle of claim 20 wherein the bias means includes a leaf spring having a first end mounted to the stop tube and a second end coupled to the stop slide.

* * * * *

UNITED STATES PATENT AND TRADEMARK OFFICE
CERTIFICATE OF CORRECTION

PATENT NO. : 4,811,983

DATED : March 14, 1989

INVENTOR(S) : Verne C. Watts et al.

It is certified that error appears in the above-identified patent and that said Letters Patent is hereby corrected as shown below:

Column 7, line 19, claim 20, insert "cylinder body;" after "the"

Signed and Sealed this

Twenty-ninth Day of August, 1989

Attest:

DONALD J. QUIGG

Attesting Officer

Commissioner of Patents and Trademarks